(12) United States Patent
Hembury

(10) Patent No.: US 7,996,258 B2
(45) Date of Patent: Aug. 9, 2011

(54) COMPUTER SYSTEM AND METHOD FOR STATEWIDE OR OTHER JURISDICTION REGISTERING AND MONITORING OF VEHICLE LOCATIONS

(76) Inventor: Christine M. Hembury, Pittston, PA (US)

( * ) Notice: Subject to any disclaimer, the term of this patent is extended or adjusted under 35 U.S.C. 154(b) by 137 days.

(21) Appl. No.: 12/315,897

(22) Filed: Dec. 8, 2008

(65) Prior Publication Data
US 2010/0145759 A1    Jun. 10, 2010

(51) Int. Cl.
*G06Q 99/00* (2006.01)
(52) U.S. Cl. ........ 705/13; 701/29; 701/30; 701/32; 701/300; 701/1
(58) Field of Classification Search .......... 701/29, 701/30, 32, 300, 1; 705/13
See application file for complete search history.

(56) References Cited

U.S. PATENT DOCUMENTS

| | | | | |
|---|---|---|---|---|
| 5,657,008 | A | 8/1997 | Bantli | 340/933 |
| 5,748,301 | A * | 5/1998 | Muller et al. | 356/155 |
| 5,898,391 | A | 4/1999 | Jefferies et al. | 340/988 |
| 6,240,365 | B1 | 5/2001 | Bunn | 701/213 |
| 6,285,931 | B1 | 9/2001 | Hattori et al. | 701/29 |
| 6,298,306 | B1 | 10/2001 | Suarez et al. | 701/213 |
| 6,448,889 | B1 | 9/2002 | Hudson | 340/425.5 |
| 6,542,818 | B1 | 4/2003 | Oesterling | 701/209 |
| 6,678,612 | B1 | 1/2004 | Khawam | 701/213 |
| 6,717,527 | B2 | 4/2004 | Simon | 340/825.36 |
| 6,718,263 | B1 | 4/2004 | Glass et al. | 201/213 |
| 7,346,439 | B2 | 3/2008 | Bodin | 701/36 |
| 7,358,857 | B1 * | 4/2008 | White | 340/572.8 |

(Continued)

FOREIGN PATENT DOCUMENTS
KR        20-0412572        3/2006

OTHER PUBLICATIONS

Palmquist, U. Distributed on-board systems using computer networks, Jun. 8-10, 1994, Vehicular Technology Conference, 1994 IEEE 44th, p. 1103.*
Mauer, G.F., On-Line Cylinder Fault Diagnostics for Internal Combustion Engines, 1990, Industrial Electronics, IEEE Transactions, vol. 37, Issue, 3, pp. 221-226.*

(Continued)

*Primary Examiner* — Akiba K Robinson Boyce
(74) *Attorney, Agent, or Firm* — Michael F. Petock, Esq.; Petock & Petock, LLC

(57) ABSTRACT

A computer system and a method as a part of the registration and/or inspection system of a state or other jurisdiction results in the assignment of a vehicle identification code to each vehicle and notification to the registrant to take the vehicle to an inspection/installation facility wherein a GPS receiver and transmitter are either installed, updated or checked for operability on a regular basis, such as yearly. Each registered vehicle in a state or other jurisdiction, as a result of the regular registration process or as the result of a temporary registration process when the vehicle enters the state temporarily, has a GPS receiver and transmitter transmit in real time location data of the vehicle via a wireless communication system such a WiFi, cellular, satellite or other system to an electronic storage subsystem which stores for each vehicle identification code the location data and time in real time and maintains it for a predetermined period of time, such as twelve months. This data may be accessed by authorized users for various purposes including law enforcement, emergency responses and/or roadway planning studies and the like. The data may also be used in settlement of negligence or criminal complaints. An alarm detection system detects either the loss of signal or a tampering signal transmitted to the state computer system.

27 Claims, 1 Drawing Sheet

U.S. PATENT DOCUMENTS

| | | | |
|---|---|---|---|
| 2004/0021579 A1* | 2/2004 | Oursler et al. | 340/870.07 |
| 2005/0071079 A1 | 3/2005 | Godfrey et al. | 701/207 |
| 2005/0088320 A1* | 4/2005 | Kovach | 340/933 |
| 2006/0026017 A1 | 2/2006 | Walker | 705/1 |
| 2006/0212195 A1 | 9/2006 | Veith et al. | 701/35 |
| 2007/0069786 A1 | 3/2007 | Arnold | 340/425.5 |
| 2008/0028038 A1* | 1/2008 | Kaplan | 709/217 |
| 2008/0133080 A1* | 6/2008 | Isaacs et al. | 701/33 |
| 2010/0188191 A1* | 7/2010 | Martinez de Velasco Cortina et al. | 340/5.8 |

* cited by examiner

COMPUTER SYSTEM AND METHOD FOR STATEWIDE OR OTHER JURISDICTION REGISTERING AND MONITORING OF VEHICLE LOCATIONS

FIELD OF THE INVENTION

The present invention relates to a computer system and method for statewide or other jurisdiction registering and monitoring of vehicle locations. More particularly, the present invention is directed to a computer system and method wherein substantially all vehicles in a jurisdiction would be registered, assigned a vehicle identification code and provided with a global positioning receiver and wireless transmitter wherein the position of the vehicle at all times would be transmitted back to a government computer system and recorded in real time for access by authorized users.

BACKGROUND OF THE INVENTION

Presently across the nation, there are frequent high speed chases by police to catch a perpetrator or suspected perpetrator of a crime. These high speed chases are dangerous to the police officers and even more dangerous to the unsuspecting public traveling along the roadways. There is a need to reduce the number of high speed police chases which result in numerous injuries each year to innocent members of the public, police officers and others.

Additionally, there are numerous traffic crimes each year which go unrecognized and uncontrolled because of the inability of law enforcement to monitor violations such as speeding, violation of stop signs and other violations. A more effective law enforcement in this area is needed.

Additionally, when there is an emergency in an area, it is often difficult to know which vehicles are located in the area. All of these vehicles may need assistance to protect lives and property. At present, the only way to know what vehicles may be in the area is if there are witnesses to provide such data to emergency personnel.

Further, when a crime is committed, whether it be a murder, burglary, robbery, rape or other serious crime, there is no way of ascertaining what vehicles may have been in the area at the time of the crime in the absence of an eye witness who is able and willing to identify the vehicle and report it to law enforcement. Further, it is often very expensive for law enforcement to track down such information. There is a need for a better approach in this area.

When there is a traffic accident, it is often desirable to determine what happened and who is financially responsible for the accident. At present, this is often a very time consuming and expensive procedure often times involving litigation, including discovery in the form of depositions and other discovery, and sometimes a court trial.

In recent years, the United States Department of Defense developed a global positioning system officially known as NAVSTAR-GPS and usually referred to as GPS. GPS utilizes a constellation of approximately twenty four to thirty two medium earth orbit satellites that transmit precise microwave signals. This enables GPS receivers to determine the location of the GPS receiver at any particular time.

SUMMARY OF THE INVENTION

An advantage of the present invention is that it will reduce the need for high speed chases by police to catch a perpetrator or suspected perpetrator of a crime as the location of a vehicle will be readily and instantaneously available to law enforcement. This will enable the placement of effective road blocks reducing the need for high speed chases. This will reduce the instances of injury to innocent members of the public, police officers and others.

Another advantage of the present invention is that it will allow law enforcement to more effectively enforce traffic laws by being able to monitor instantaneously and for a specified period of time into the past the movement of vehicles.

Another advantage of the present invention is that it will allow law enforcement to identify vehicles in a location of interest at a particular time, not only presently, but for a specified period of time in the past.

Another advantage of the present invention is that it will provide the location of particular vehicles at a particular time in the past and at a plurality of times in the past, which may be closely related, enabling accident reconstruction and other efforts at determining who is financially responsible for an accident.

Another advantage of the present invention is that it will enable law enforcement and other government agencies to monitor vehicles entering into sensitive areas such as areas near nuclear power plants, to enable terrorism prevention and/or other acts of sabotage.

Another advantage of the present invention, is that it would be a significant aid in solving hit and run accidents.

Another advantage of the present invention, is that it would be a significant aid in the managing of emergencies and may improve recovery efforts more rapidly during natural disasters such as hurricanes, tornadoes, floods, snow storms and the like.

Another advantage of the present invention is that it would enable suspected perpetrators of a crime to be stopped by a well placed road block based upon information from the present invention rather than a high speed chase.

Another advantage of the present invention is that it may decrease the cost and time expended on performing statistical research for determining data such as how many vehicles pass on a particular roadway each day.

Another advantage of the present invention, particularly in border states, is that Homeland Security could require the installation of a temporary GPS receiver and transmitter be hooked into the system of the present invention when a vehicle enters into the state or jurisdiction, thereby being able to effectively track the vehicle and minimize the threat of terroristic acts in our country. These temporary tags could be placed on all motor vehicles entering the jurisdiction, such as cars, trucks, buses, motorcycles, all terrain vehicles and boats.

Another advantage of the present invention is that the data comprising the location of a registered vehicle could be maintained for a specified period of time such as twelve months or such longer or shorter time as may be desired by the particular state or other jurisdiction. After the predetermined time period of memory storage is reached, such as twelve months, data relating to the location of the vehicle more than twelve months old could be purged.

Another advantage of the present invention is that in accident reconstruction, data would be available continuously for the last twelve months thereby enabling accident reconstruction to determine how fast each driver was driving and who may be at fault because of the ability to retrieve the recorded time correlated position of the vehicles. This may reduce the time and expense spent on litigation, insurance claims or fraud. It may be possible for insurance companies to defray some of the administrative cost of the system as they could be a major beneficiary as a result of reducing the cost of claim determination.

Another advantage of the present invention is that teenagers and/or inexperienced drivers may be assigned a vehicle identification code which indicates their driving status. This would enable law enforcement to document and review speed, curfew compliance and the whereabouts of inexperienced young drivers in an attempt to reduce accidents and fatalities.

This information could be shared with insurance companies for risk assessment purposes and the insurance companies may pay a fee to defray the cost of maintaining the system.

Another advantage of the present invention is that it would provide a means for law enforcement to continuously track the whereabouts of vehicles of sex offenders, particularly in relation to schools, playgrounds and other places frequented by minors.

Another advantage of the present invention is that the system of the present invention may be used in conjunction with a GPS receiver already installed in a vehicle thereby reducing the cost of initial installation in particular vehicles having a GPS receiver already installed.

Briefly and basically, in accordance with the present invention, a computer system is provided which comprises a means for inputting into a computer an application for registration for substantially each vehicle in a jurisdiction. Means are provided for processing each application and notifying each applicant to take each vehicle for which registration was applied to an inspection/installation facility. The inputting of the application into the computer system may be by an applicant for registration or inspection or may be done automatically by a computer process at the renewal time each year once a vehicle has been registered. The computer system further includes means for notifying at least one of a plurality of vehicle/inspection installation facilities of a vehicle identification code for each vehicle for which registration was applied for. The computer system further includes means for inputting data from an inspection/installation facility when a GPS receiver with a wireless transmitter has been installed on the vehicle for which registration was applied. Means are provided for receiving from each wireless transmitter information in the form of a vehicle identification code and current location information. Means are provided for storing the vehicle information code and location information relating to that vehicle information code in real time a memory for a predetermined period of time, which for example may be twelve months, six months, two years or any other suitable time period. In other words, for each vehicle, the vehicle identification code would be recorded with the location data and time recorded continuously as it occurs in real time or substantially in real time. For each vehicle identified by the vehicle identification code, time and location data would be continuously recorded. Means are further provided for inputting into the computer selectively a request for location information for a particular time or times from an authorized user. Means are also provided for processing the inputted request for information and providing a response to the authorized user in response to the request.

In an ideal embodiment, each vehicle registered in a jurisdiction and each vehicle entering a jurisdiction through a border point would have an application inputted into the computer for the issuance of a GPS receiver with a wireless transmitter having a vehicle identification code for transmission of location data connected to the vehicle code to the central computer.

Briefly and basically, in accordance with the method of the present invention, a method is provided of inputting into a computer one of a plurality of applications for registration of a vehicle in a jurisdiction. The method further includes the step of processing by the computer the application and notifying an applicant to take the vehicle for which registration was applied to an inspection/installation facility. The method further includes the step of processing by the computer the application and notifying an applicant to take the vehicle for which registration was applied to an inspection/installation facility. The method further includes a step of notifying at least one of a plurality of vehicle inspection/installation facilities of a vehicle identification code for the registration applied for vehicle. The method includes the step of inputting data into the computer from an inspection/installation facility when a GPS receiver and wireless transmitter has been installed on the vehicle for which registration was applied for. The method further includes the step of providing a memory in the computer for storing data related to the location of the vehicle identified by the vehicle identification vehicle code and storing in substantially real time in the memory the time and location for the vehicle identification code for a predetermined period of time. The method further includes the step of inputting selectively a request for vehicle location information or particular times from an authorized user and processing the inputted request for information and providing a response to the authorized user in response to the request. The method further includes the steps of repeating the aforesaid steps of inputting an application, processing, notifying, inputting data and storing for substantially all vehicles registered in a jurisdiction.

In a particular embodiment, the authorized users would include law enforcement and emergency services personnel.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF THE PREFERRED EMBODIMENTS

Figure 1:
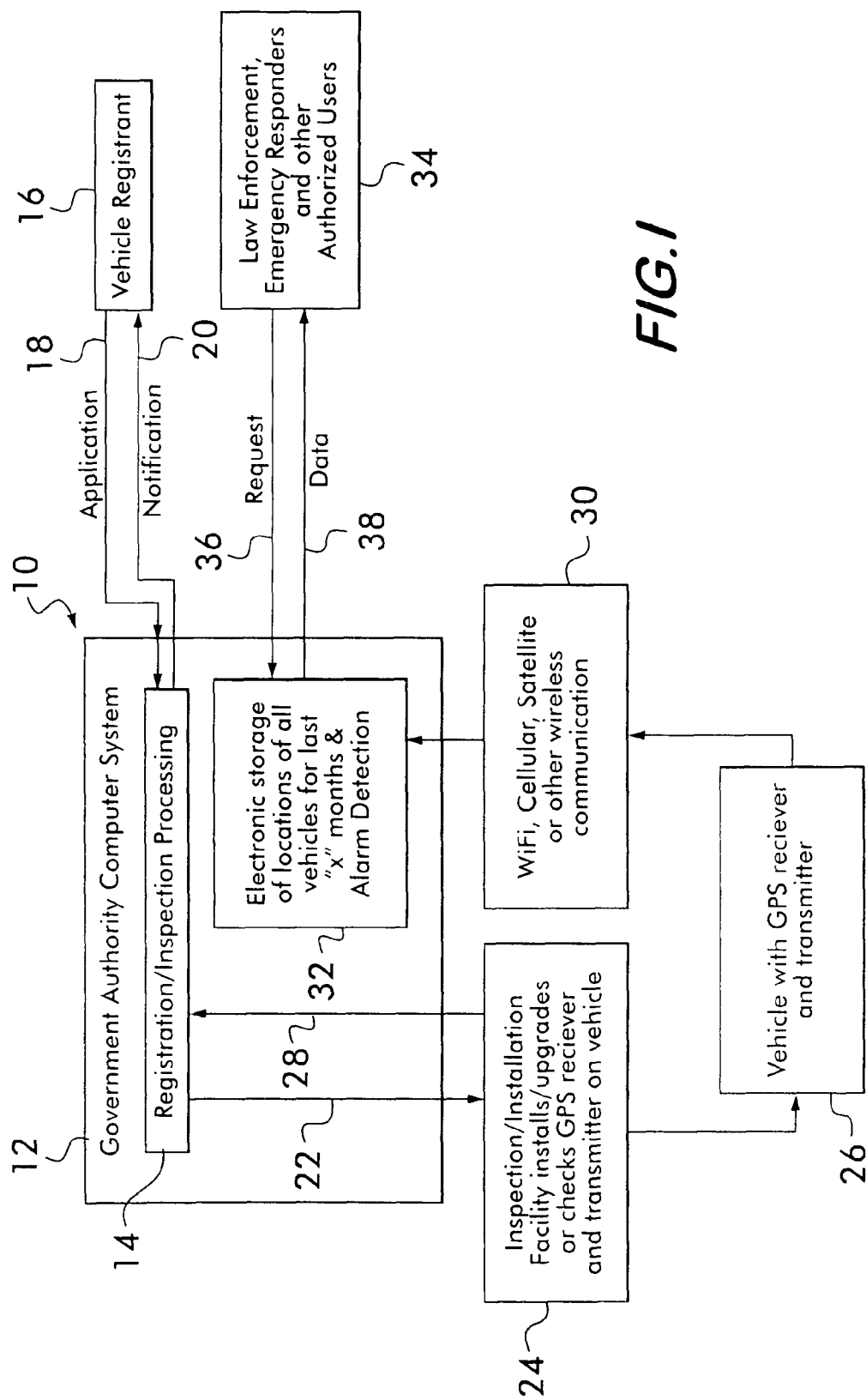
FIG. 1 is a block diagram of a computer system for statewide or other jurisdiction registration and monitoring of vehicle locations and which also illustrates the method.

Referring now to the drawings, there is shown in FIG. 1 a system 10 for registering all or substantially all of the vehicles in a state or other jurisdiction, assigning a vehicle identification code which maybe correlated to a license plate of a vehicle, installing on the vehicle a global positioning system (GPS) receiver and a wireless transmitter on each registered vehicle wherein the vehicle with the GPS receiver continuously transmits via a wireless system location or position information for each instant of time of the vehicle correlated with the vehicle identification code for storage for a predetermined period of time, such as twelve months. The system further includes the ability of a vehicle registrant to apply for registration and a system for notification of the Applicant to take the vehicle to an inspection/installation facility for the installation, confirmation of operability of a previously installed or upgrading of a GPS receiver and transmitter and to insure proper operation. The system further includes means for law enforcement, emergency responders and other authorized users to access the electronically stored information keyed to the vehicle identification code for data relating to the vehicle's position at any particular time and for a predetermined period of time in the past such as the previous twelve months. The GPS receiver on the vehicle is provided with a tampering device that if the GPS receiver is removed or disabled, an alarm is sent via the transmitter and activates an alarm at the computer 12.

More specifically, the government authority computer system or computer 12 may be a centrally located computer or components spread around the state or jurisdiction and interconnected by various known computer links including, but not limited to microwave links, high speed data lines and/or the internet. Computer 12 includes a registration/inspection processing sub-system to which applications from vehicle registrant 16 are received as shown by line 18. An application would have to be inputted via line 18 when a vehicle, particularly a new vehicle is purchased. An application may also be required to be submitted at periodic intervals, such as yearly or some other selected time period. However, an application may not need to be submitted periodically, but may be generated by the government authority computer system 10 wherein previously registered vehicles are automatically issued a notification via line 20 to take their vehicle to an inspection/installation facility to have their GPS receiver and transmitter updated and/or checked and verified, along with any other inspection requirements for the particular state or jurisdiction.

Substantially simultaneously with the approval of the application and notification to vehicle registrant to take the vehicle to an inspection/installation facility or shortly thereafter, the registration/inspection processing subsystem 14 may assign a vehicle identification code to the vehicle for which registration has been applied for. The vehicle identification code may be any suitable code generated by registration/inspection processing sub-system 14 or it may be the vehicle identification number (VIN), the license plate number, or any other suitable code. The vehicle identification code is transmitted or sent to inspection/installation facility 24 via line 22. Simultaneously with the transmission of the vehicle identification code via line 22, other appropriate information is sent to the inspection/installation facility 24 to enable the inspection/installation facility 24 to properly code a GPS receiver to be correlated with the vehicle identification code for the particular vehicle for which registration was applied for.

Inspection/installation facility 24 in the case of a new vehicle registration would install a GPS receiver and a wireless transmitter on the vehicle 26 identified by the government authority computer system 12. The GPS receiver or transmitter would be provided with the vehicle identification code provided from the government authority computer system 12 for transmission of the code with the location information. Inspection/installation facility 24 would also check that the vehicle GPS receiver and transmitter are working properly, properly transmitting the vehicle identification code and location data via the wireless transmitter. When the inspection/installation facility 24 successfully installs the GPS receiver and transmitter, and the GPS receiver is working properly and the transmitter is transmitting the location data along with the vehicle identification code via the wireless transmitter, means is provided for inputting data to computer system 12, such as by a wireless network, data line or other means indicated by line 28, that the inspection/installation facility has successfully installed the GPS receiver with the wireless transmitter on the vehicle for which registration was applied for.

In cases where vehicle 26 already has a GPS receiver and wireless transmitter and is already transmitting the vehicle identification code and location data such as in the case where a vehicle was previously registered and processed in the state or jurisdiction, the inspection/installation facility may merely need to verify that the system is properly installed and operational and transmit this confirmation via line 28 back to the registration/inspection processing sub-system 14 of the government authority computer system 12. The system may operate in several ways, (1) a new GPS receiver and wireless transmitter are installed periodically, such as yearly, (2) a new GPS receiver and wireless transmitter are only installed when there is a change in equipment such as an equipment upgrade or (3) vehicles with already installed operational GPS receivers and wireless transmitters properly transmitting the proper vehicle identification code to the government authority computer system 12 not be changed, but only verified to the government authority computer system that the system is in fact operating properly.

The wireless transmitter on vehicle 26 transmits the GPS location data and the vehicle identification code information via a wireless communication network such as WiFi, cellular network, satellite communication or other wireless communication as shown by block 30. The vehicle identification code and continuous position or location data is transmitted to an electronic storage sub-system 32 in the government authority computer system 12. In this manner there is a continuous transmission by the wireless transmitter on vehicle 26 of its location along with the vehicle identification code which is carried over wireless communication network 30 and electronically stored in electronic storage sub unit 32. Electronic storage sub-system 32 may store this continuous data for each vehicle for a predetermined period of time such as one month, six months, one year, two years or whatever period of time may be desired. Once data is older than the prescribed storage time period, such as one year, the data is purged from the system and the memory may be reused. The information stored may be stored in real time or substantially in real time. This information will include for each vehicle the vehicle identification code, the time and location of the vehicle identified by the vehicle identification code. In other words, an electronic storage system subsystem 32 would store in real time or substantially in real time for each vehicle identification code the location at each instant in time. This stored data may then be accessed at any time during the predetermined period of time for which it is stored, such as the twelve month period, until it is purged. In other words, during that period the location of the vehicle may be pinpointed at any instant in time and its movements may be revealed or documented during any particular time period within a predetermined period of time for which it is stored, such as a twelve month period.

Vehicle 26 may be provided with a detection system for detecting the removal or tampering with of the GPS receiver or the vehicle code. This would cause the sending of an alarm signal via the transmitter to electronic storage sub-system 32 which contains an alarm detection circuit or software. This alarm detection would then trigger an alarm in the government authority computer system which would enable government authorities to take appropriate action to correct the condition. Additionally or alternatively, the alarm detection circuit in subsystem 32 may include a circuit for detecting the loss of signal from a vehicle and energizing an alarm. In this manner, disabling of the transmitter still generates an alarm signal.

System as described so far could be utilized to register all or substantially all of the vehicles registered in a jurisdiction. In a presently preferred embodiment all vehicles registered in a jurisdiction would be required to apply for registration and have a vehicle identification code assigned, a GPS receiver and transmitter installed and have their location monitored. However, there may be a necessity to have certain vehicles exempted from the system, such as Central Intelligence Agency vehicles, presidential vehicles or other highly sensitive vehicles for which it would not be desired to monitor and record their movements.

With the monitoring and recording of the location of all or substantially all of the vehicles registered in a jurisdiction, with the location for each vehicle identification code being stored and retrievable for a period of time such as twelve months, the advantage of the invention as set forth above may be achieved.

In achieving the advantages of the present invention, law enforcement, emergency responders and other authorized users 34 may request information from electronic storage sub-system 32 via line 36. This request may be made by any suitable means including a wireless communication from a law enforcement vehicle such as a police car. A law enforcement office may make a request via a wireless network, a landline or other suitable communication system. Authorized users may also include emergency responders either from an office location or at the site of an emergency via all of the various communication networks. Other authorized users may also access the system such as government agencies doing studies on the usage rate of various roads. These requests may request the number of vehicles passing a point in a particular direction over a specified period of time Other authorized users may also access the data via various communication modalities. Other requests such as from a law enforcement office could include identification of all vehicles, in a particular area at a particular time. The electronic storage subsystem 32 may store in addition to the vehicle identification code, time and location information other information about each vehicle identified by its vehicle identification code and its users, such as the make and type of automobile, the owner, registered users of the vehicle and other information which may be helpful to law enforcement and others.

Electronic storage sub-system 32 would process the request and if it was provided from a valid authorized user having a proper identification code, the data could be sent via line 38 which may also include various communication modalities including land lines wireless networks, satellite networks and other communication systems. The data sent on line 28 may include various information including the vehicle identification code, license plate number, information about the registrant and the location data. This data may preferably be provided such that it may be displayed on a monitor showing the aforesaid information as well as the location of the vehicle on a map of the area in which the vehicle is located. However, other various ways of transmitting this information may be utilized including voice, either by personnel or by voice generation circuitry, or information may be provided in text form.

In accordance with the method of the present invention, the method includes the steps of inputting into a computer one of a plurality of applications for registration of a vehicle in a jurisdiction. Preferably, all or substantially all of the vehicles in a jurisdiction would be registered. The method includes the step of processing by the computer the application and notifying an applicant to take the vehicle for which registration was applied to an inspection/installation facility. The method further includes the step of notifying at least one of a plurality of vehicle/installation facilities of a vehicle identification code for the registration applied for vehicle. The method further includes a step of inputting data into the computer from an inspection/installation facility when a GPS receiver and a wireless transmitter have been installed on the vehicle and are capable of transmitting vehicle identification code and location information for the vehicle. The method includes the steps of providing a memory in the computer for storing data relating to the location of said vehicle identification code and storing in the memory location data for the vehicle identification code for a predetermined period of time. Further, the method includes inputting selectively a request for vehicle location information for a particular time or times from an authorized user. The method further includes the step of processing inputted request for information and providing a response to the authorized user in response to the request and the step of repeating the inputting of an application, the processing of the application, the notifying of the vehicle/inspection facilities, the inputting of data from the inspection/installation facilities when the GPS receiver and wireless transmitter are installed and operating properly and storing in memory location and time data for the vehicle identification code.

The present invention may be embodied in other specific forms without departing from the spirit or essential attributes thereof and, accordingly, reference should be made to the appended claims, rather than to the foregoing specification as indicating the scope of the invention.

I claim:

1. A computer system, comprising;
   means for inputting into a computer an application for registration for substantially each vehicle in a jurisdiction;
   means in said computer for processing each said application and as a result of processing said application, notifying each applicant to take each vehicle for which registration was applied to an inspection/installation facility;
   means for notifying in response to said processing of said application at least one of a plurality of vehicle inspection/installation facilities of a vehicle identification code for each vehicle for which registration was applied for;
   means for inputting data into said computer from a notified vehicle inspection/installation facility when a GPS receiver with a wireless transmitter instantaneously transmitting current location information of said vehicle derived from said GPS receiver along with said vehicle identification code are installed on said vehicle for which registration was applied and is operating properly;
   means for receiving from each said wireless transmitter mounted on said vehicle information in the form of a vehicle identification code and current location information generated by said GPS receiver mounted on said vehicle;
   means for storing in said computer said vehicle information code and related location information for each instant in time in substantially real time for a predetermined period of time;
   means for inputting into said computer selectively a request for vehicle location information for one or more particular times from an authorized user;
   means for processing by said computer said inputted request for information and providing a response to said authorized user in response to said request.

2. A computer system in accordance with claim 1 wherein said means for inputting into a computer applications includes means for inputting an application for each vehicle registered in a jurisdiction.

3. A computer system in accordance with claim 1 wherein said means for selectively inputting a request from an authorized user includes a request inputted to said computer for information about a particular vehicle.

4. A computer system in accordance with claim 1 wherein said request includes requests for information about vehicles in a particular area at a particular time.

5. A computer system in accordance with claim 1 wherein said request includes information with respect to the number of vehicles passing a point in a particular direction over a selected period of time.

6. A computer system in accordance with claim 1 wherein an alarm detection system detects a loss of signal from a transmitter of said vehicle.

7. A computer system in accordance with claim 1 wherein said computer system includes an alarm system for detecting a signal indicating tampering with a GPS receiver and/or transmitter located on said vehicle.

8. A method, comprising the steps of:
inputting into a computer system one of a plurality of applications for registration of a vehicle in a jurisdiction;
processing by said computer system said application and as a result of processing said application, notifying an applicant of said application to take the vehicle for which registration was applied to an inspection/installation facility;
said computer system notifying in response to said processing of said application at least one of a plurality of vehicle inspection/installation facilities of a vehicle identification code for said registration applied for vehicle;
inputting data into said computer system from a notified inspection/installation facility when a GPS receiver and wireless transmitter are installed on said vehicle for which registration was applied for and said transmitter is transmitting the vehicle identification code for said vehicle and location information derived from said GPS receiver on said vehicle;
providing a memory in said computer system for storing data relating to the location of said vehicle identification code;
storing in said memory in said computer system time and location data for said vehicle identification code in at least substantially real time for a predetermined period of time;
inputting into said computer system selectively a request for vehicle location information for a particular time or times from an authorized user,
processing by said computer system said inputted request for information and said computer system providing a response to the authorized user in response to said request; and
repeating the aforesaid steps of inputting an application into said computer system, processing by said computer system, notifying by said computer system, inputting data to said computer system, and storing in said memory in said computer system for substantially all vehicles registered in a jurisdiction.

9. A method in accordance with claim 8 wherein said authorized users include law enforcement and emergency services personnel as confirmed by said computer system.

10. A method in accordance with claim 8 wherein said step of inputting into said computer system selectively a request for vehicle location information includes a request processed by said computer system for other information stored in said memory of said computer system relating to the vehicle or its registrant.

11. A method in accordance with claim 8 wherein said step of inputting into said computer system selectively a request for vehicle location information includes a request processed by said computer system for identification of vehicles located in a particular area at a particular time stored in said memory in said computer system.

12. A method in accordance with claim 8 wherein said step of inputting into said computer system selectively a request for vehicle location information includes a request processed by said computer system for the number of vehicles passing a particular point in a particular direction during a selected period of time as stored in said memory in said computer system.

13. A method in accordance with claim 8 wherein said method includes the step of energizing an alarm by said computer system as a result of the detection by said computer system of a loss of signal from said vehicle transmitter.

14. A method in accordance with claim 8 including the step of detecting by said computer system a tampering signal generated as a result of tampering with said GPS receiver and/or wireless transmitter located on said vehicle and energizing an alarm by said computer system.

15. A computer system in accordance with claim 2 wherein said means for inputting into a computer an application for registration for substantially each vehicle in a jurisdiction includes means for inputting into said computer system an application for temporary registration of a vehicle entering at a border point.

16. A method in accordance with claim 8 wherein said step of inputting into a computer system one of a plurality of applications for registration of a vehicle in a jurisdiction includes inputting into said computer system an application for temporary registration of a vehicle at a border point.

17. A computer system, comprising;
means for inputting into a computer an application for registration for substantially each vehicle entering a jurisdiction at a border point;
means for processing each said application and as a result of processing said application, notifying an applicant of said application to take each vehicle for which registration was applied to an inspection/installation facility;
means for notifying in response to said processing of said application at least one of a plurality of vehicle inspection/installation facilities of a vehicle identification code for each vehicle for which registration was applied for;
means for inputting data to said computer from an inspection/installation facility when a GPS receiver with a wireless transmitter instantaneously transmitting current location information of said vehicle derived from said GPS receiver along with said identification code are installed on said vehicle for which registration was applied and is operating properly;
means for receiving from each said wireless transmitter mounted on said vehicle information in the form of a vehicle identification code and current location information generated by said GPS receiver mounted on said vehicle;
means for storing in said computer said vehicle information code and related location information for each instant in time in substantially real time for a predetermined period of time;
means for inputting into said computer selectively a request for vehicle location information for one or more particular times from an authorized user;
means for processing in said computer said inputted request for information and providing a response to said authorized user in response to said request.

18. A computer system in accordance with claim 17 wherein said means for selectively inputting into said computer a request from an authorized user includes a request for information about a particular vehicle.

19. A computer system in accordance with claim 17 wherein said request includes requests for information about vehicles in a particular area at a particular time.

20. A computer system in accordance with claim 17 including an alarm detection system which detects a loss of signal from a transmitter of said vehicle.

21. A computer system in accordance with claim 17 wherein said computer system includes an alarm system for detecting a signal indicating tampering with a GPS receiver and/or transmitter located on said vehicle.

22. A method, comprising the steps of:
inputting into a computer one of a plurality of applications for registration of a vehicle entering a jurisdiction at a border point;
processing by said computer said application and as a result of processing said application, notifying an applicant of said application to take the vehicle for which registration was applied to an inspection/installation facility;
notifying in response to said processing of said application at least one of a plurality of vehicle inspection/installation facilities of a vehicle identification code for said registration applied for vehicle;
inputting data into said computer from an inspection/installation facility when a GPS receiver and wireless transmitter instantaneously transmitting current location information of said vehicle derived from said GPS receiver along with said vehicle identification code are installed on said vehicle for which registration was applied for and said transmitter is transmitting vehicle identification code and location information properly;
providing a memory in said computer for storing data relating to the location as generated by said GPS receiver mounted on said vehicle and transmitted by said transmitter for the vehicle assigned said vehicle identification code;
storing in said memory time and location data for said vehicle identification code in at least substantially real time for a predetermined period of time;
inputting into said computer selectively a request for vehicle location information for a particular time or times from an authorized user,
processing by said computer said inputted request for information and providing a response to the authorized user in response to said request; and
repeating the aforesaid steps of inputting an application into said computer, processing by said computer, notifying by said computer, inputting data into said computer, and storing in said computer for substantially all vehicles entering said jurisdiction at a border point.

23. A method in accordance with claim 22 wherein said authorized users include law enforcement and emergency services personnel.

24. A method in accordance with claim 22 wherein said step of inputting selectively a request for vehicle location information includes a request for other information relating to the vehicle or its registrant.

25. A method in accordance with claim 22 wherein said step of inputting selectively a request for vehicle location information includes a request for identification of vehicles located in a particular area at a particular time.

26. A method in accordance with claim 22 wherein said method includes the step of energizing an alarm as a result of the detection of a loss of signal from said vehicle transmitter.

27. A method in accordance with claim 22 including the step of detecting a tampering signal generated as a result of tampering with said GPS receiver and/or wireless transmitter located on said vehicle and energizing an alarm.

* * * * *